United States Patent [19]
Lorenz

[11] Patent Number: 5,950,617
[45] Date of Patent: Sep. 14, 1999

[54] ACCESSORY SUPPORT SYSTEM ATTACHABLE TO A MOTOR VEHICLE

[76] Inventor: William D Lorenz, 24 Cloverleaf Dr., Depew, N.Y. 14043

[21] Appl. No.: 08/790,552

[22] Filed: Jan. 30, 1997

[51] Int. Cl.[6] .............................. F24C 1/16; A47B 23/00; E04H 15/26; B60R 11/00
[52] U.S. Cl. ......................... 126/276; 126/25 R; 108/44; 135/99; 224/488; 224/519
[58] Field of Search ................. 126/25 R, 276; 280/727; D12/103, 100; D6/416; 160/53; 135/87, 88.06, 99, 16; 108/72, 44; 224/281, 488, 498, 502, 512, 554, 519, 520, 521

[56] References Cited

U.S. PATENT DOCUMENTS

| | | | |
|---|---|---|---|
| 3,295,473 | 1/1967 | Wentworth | 160/53 |
| 3,550,892 | 12/1970 | Propst | 248/282 |
| 3,759,242 | 9/1973 | Mauger | 126/25 R |
| 4,089,554 | 5/1978 | Myers | 126/25 R |
| 4,518,189 | 5/1985 | Belt | 126/276 |
| 4,645,167 | 2/1987 | Hardwick | 248/520 |
| 4,729,535 | 3/1988 | Frazier et al. | 126/25 R |
| 4,770,155 | 9/1988 | Chamberlain et al. | 124/80 |
| 5,626,126 | 5/1997 | McNulty | 126/25 R |
| 5,640,949 | 6/1997 | Smith | 126/276 |

*Primary Examiner*—Ira S. Lazarus
*Assistant Examiner*—David Lee
*Attorney, Agent, or Firm*—Hodgson, Russ, Andrews, Woods & Goodyear, LLP

[57] ABSTRACT

An accessory support system attachable to the exterior of a motor vehicle supports recreational accessories such as grills, table tops and umbrellas for use out of doors. The system comprises a lateral support assembly adapted to connect to the trailer hitch of a motor vehicle, and one or more vertical support means adapted to engage one or more recreational accessories such that the accessories are supported in a position suitable for use. The lateral support assembly may include a first lateral support rod adapted at one end to removably engage a vehicle trailer hitch and adapted at the other end to rotatably couple to a second lateral support rod via a vertical coupling means. The second lateral support rod can include a distal end portion adapted to engage a vertical support rod which supports grill means. The grill means may be positioned within about a 270° arc about the vertical coupling means so that the grill means may be advantageously situated with respect to prevailing winds or limitations in available space.

2 Claims, 9 Drawing Sheets

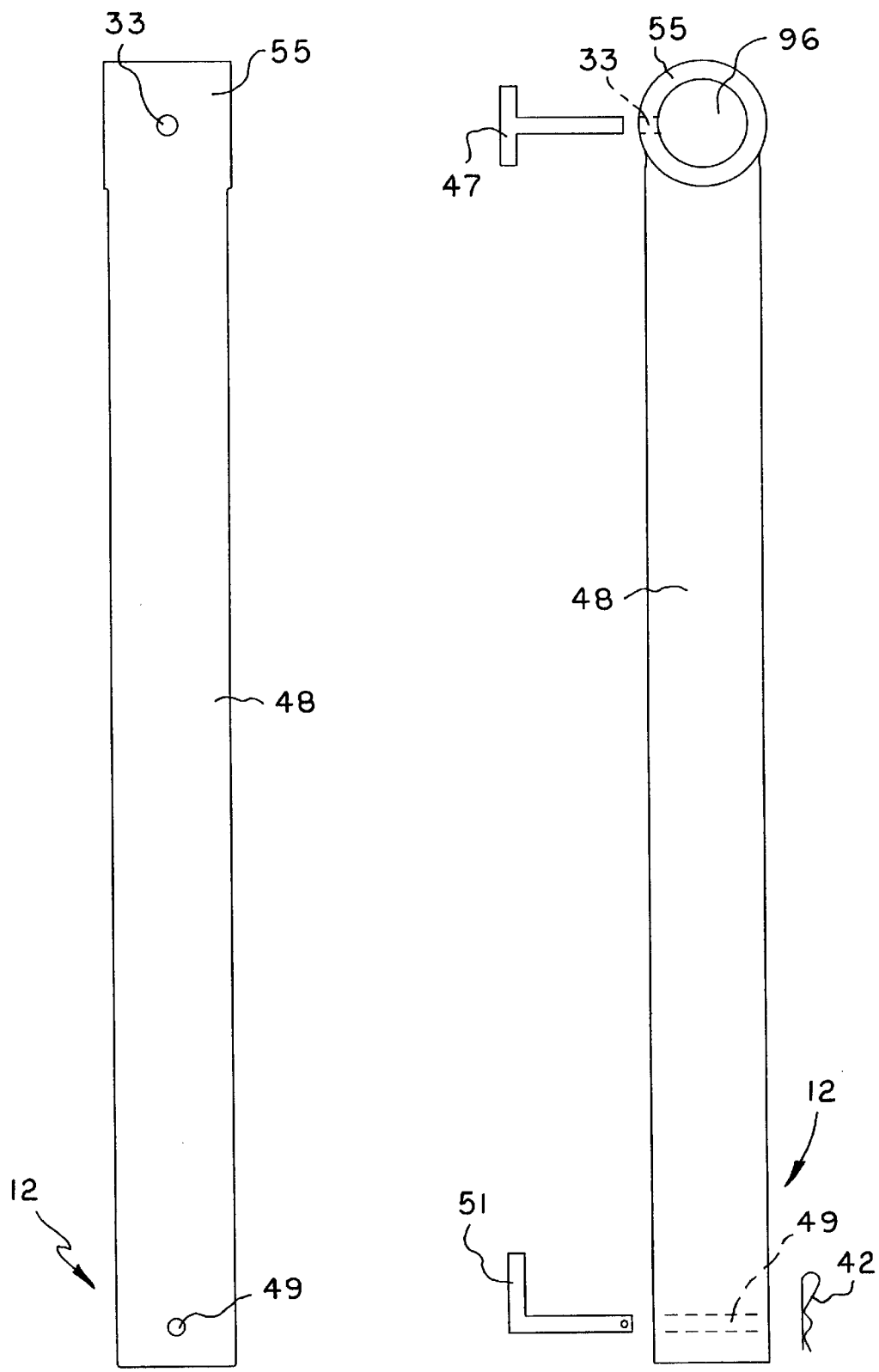

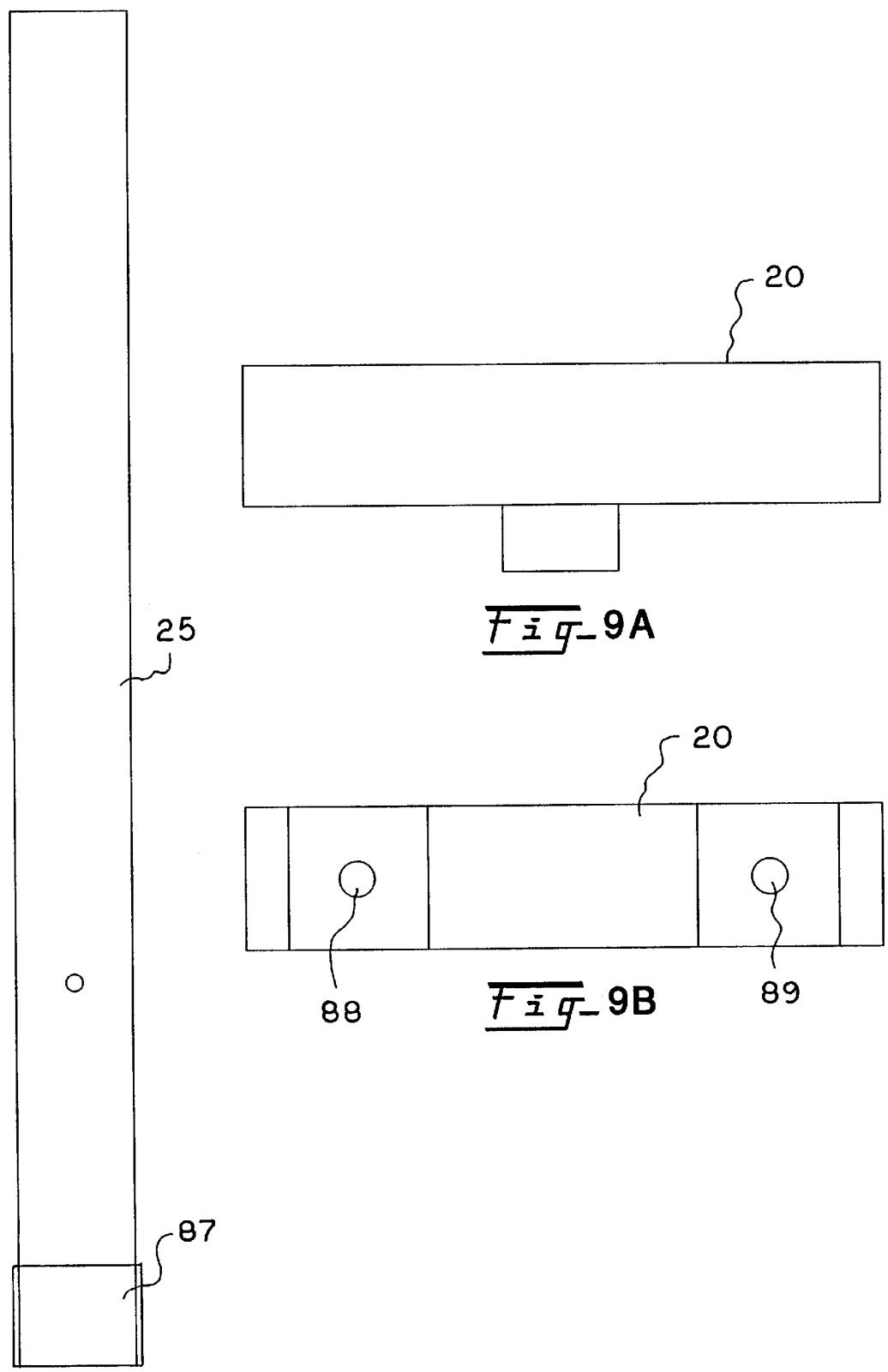

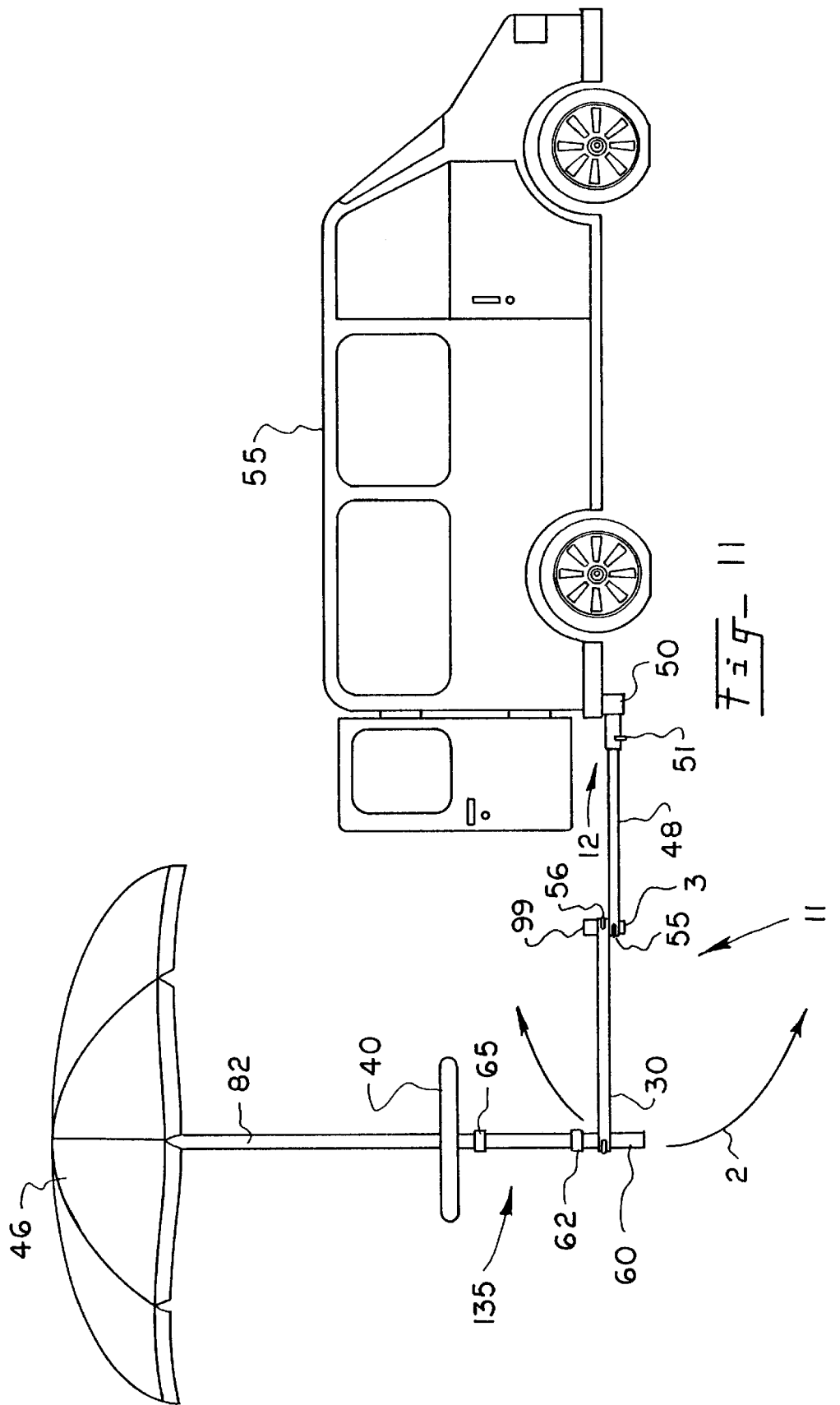

ACCESSORY SUPPORT SYSTEM ATTACHABLE TO A MOTOR VEHICLE

BACKGROUND OF THE INVENTION

1. Field of the Invention

This invention relates to systems for supporting recreational accessories such as grills and tables while they are being used for outdoor cooking, and more particularly, to a novel accessory support system which may be detachably mounted to a trailer hitch of a motor vehicle and easily assembled to support one or more such accessories.

2. Prior Art

Users of trailers, motor homes, campers, boats and other recreational vehicles often drive their vehicles to sporting events, camp sites and other locations where outdoor activities will take place. Many times these activities take place in the area surrounding the vehicle's parking site. Thus it is often convenient and desirable to prepare and consume meals in the vicinity of the vehicle. Cooking and eating outside of the vehicle frees the vehicle for other purposes and reduces the risk of fire or smoke damage to the vehicle which could occur if these activities were conducted inside the vehicle.

Cooking and dining outdoors may be accomplished with conventional coal or gas grills, portable tables and similar apparatus. However, these items have certain disadvantages when used out of doors. For example, such items can be bulky and therefore difficult to store and transport due to the nature of the required support structures, i.e. grill stands, table bases, etc. which form a part of these accessories. Additionally, they often can be easily overturned by wind unless securely anchored to the ground.

Portable grill tops, especially those without accompanying supporting structures such as carts or grill stands, or table tops, are better suited for storage inside a vehicle due to their small size and reduced storage space requirements. However, when these items are removed from the vehicle and positioned for cooking they must be adequately supported for safe operation. Accordingly, a grill must either be placed on the vehicle itself for support, or on the ground, or placed upon some other convenient support means. Likewise, a table top must be engaged with a supporting means. Locating such supporting means may be difficult, especially around campsites, sporting events or in other remote surroundings.

U.S. Pat. No. 5,263467 to Jones discloses a gas grill assembly comprising a housing, a grill, and a retractor arm assembly. The housing encloses the assembly and is permanently mountable in the wall of a recreation vehicle. However, this arrangement has the disadvantage of requiring a considerable amount of space since the housing is permanently located in the wall of the vehicle. Further, no provision is for an eating surface such as a table top.

Unlike the assembly disclosed in U.S. Pat. No. 5,263467, the present invention provides a system having one or more detachable and interchangeable accessory units which can be detachably mounted to any type of vehicle equipped with a trailer hitch or other hitch means. Also, the system of the present invention can be quickly and easily disassembled and stored in any convenient space such as, for example, the spare tire well or the trunk of the vehicle. The present invention also provides a means of conveniently supporting portable table tops, and other recreational accessories.

SUMMARY OF THE INVENTION

In view of the foregoing, it is a primary object of the invention to provide a motor vehicle accessory support system which is adapted to be detachably mounted to a vehicle, and which may be easily and quickly assembled, or disassembled and stored.

It is a further object of the invention to provide a motor vehicle accessory support system which includes table support means for supporting a table or other eating or food preparation surface.

It is a further object of the invention to provide a motor vehicle accessory support system which includes a removable table and a removable grill.

It is a further object of the invention to provide a motor vehicle accessory support system which includes rotatable lateral support coupling means thereby allowing advantageous orientation of a grill means to accommodate varying wind directions and also to conform the system to limitations in available space.

It is a further object of the invention to provide a method for supporting recreational accessories for dining out of doors. The method includes the steps of: a) providing a lateral support assembly, b) affixing the lateral support assembly to a vehicle, c) providing one or more vertical support means, d) removably engaging the one or more vertical support means to the lateral support assembly, and e) affixing one or more recreational accessories to said one or more vertical support means such that said recreational accessories are securely supported in position for use.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

FIG. 3A is a side elevation view of the first lateral support rod.

FIG. 3B is a top view of the first lateral support rod.

FIG. 8 is a side elevation view of the vertical support post.

FIG. 9A is a side elevation view of an embodiment of a grill adapter means.

FIG. 9B is a top view of a grill adapter means.

FIG. 11 is a side elevation view of a third embodiment of the present invention including a table top means and an umbrella means.

DETAILED DESCRIPTION OF THE INVENTION

The following detailed description of the embodiments of the present invention, as represented in FIGS. 1–11, is not intended to limit the scope of the invention, as claimed, but is merely representative of the presently preferred embodiments of the invention. The presently preferred embodiments of the invention will be best understood by reference to the drawings, wherein like parts are designated by like numerals throughout.

The accessory support system of the present invention comprises a lateral support assembly and one or more vertical support means for supporting recreational accessories. Representative recreational accessories which may be supported by the accessory support system of the present invention include grill means, table top means and umbrella means as shown in the accompanying drawings. The recreational accessories shown are representative only and are not intended to limit the wide range of accessories which may be supported by the system of the present invention.

Figure 1:
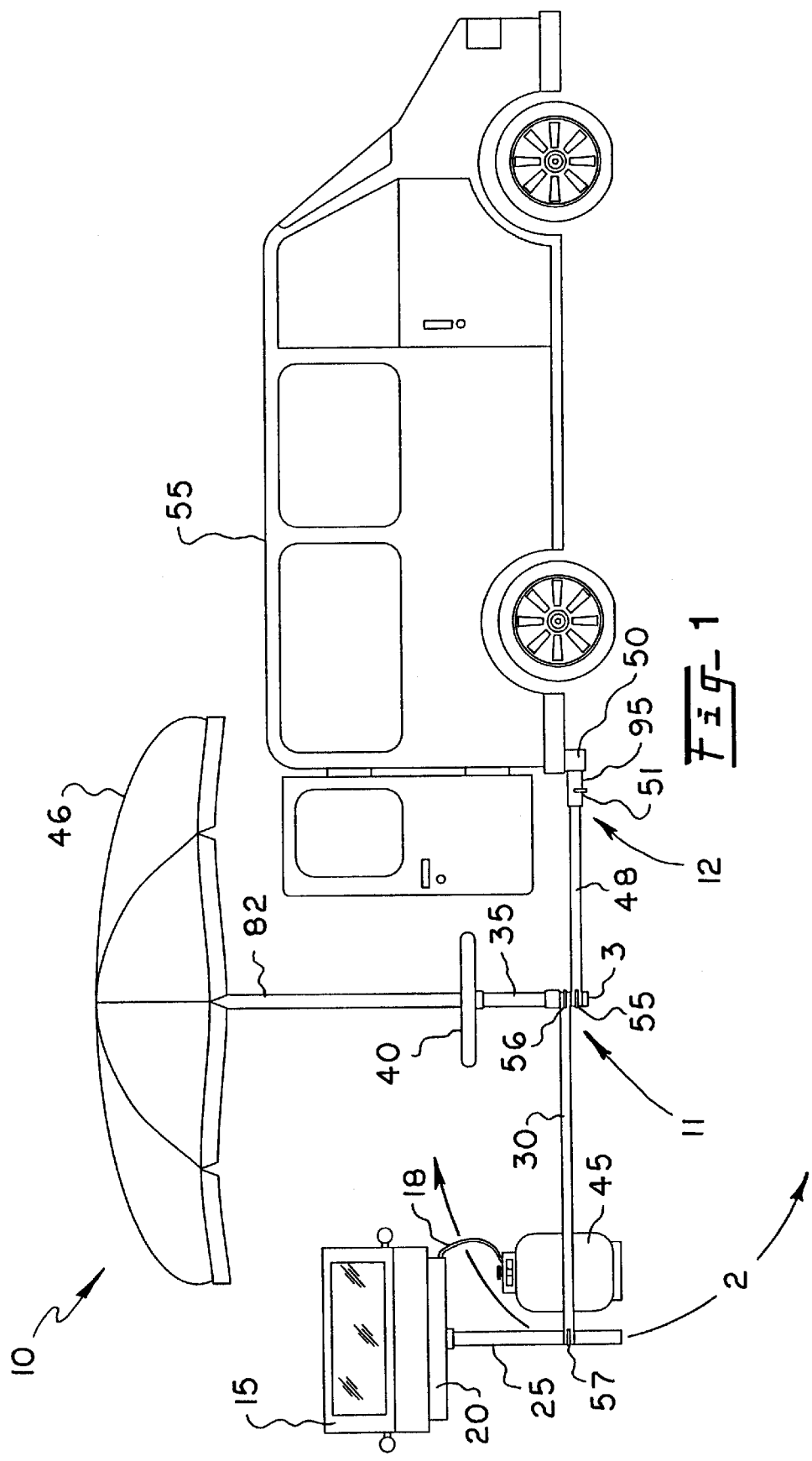
FIG. 1 is a side elevation view of the accessory support system of the present invention, including a removable grill means, table-top means and umbrella means.

One presently preferred embodiment of the motor vehicle accessory support system 10 of the present invention is shown in FIG. 1. As shown, the unit may be mounted to a trailer, or other hitch means 50 of a vehicle 55. Although described herein as being used with motor vehicles, the present invention may with its attendant advantages, also be mounted on other structures such as the external walls of cabins, homes, garages or other buildings outfitted with hitch means similar to hitch means 50 shown in FIG. 1.

The support system 10 is comprised of lateral support assembly 11 and a vertical coupling member and a vertical support member, namely, vertical coupling means 35 and vertical support means 25, which are detachably interconnected to support various recreational accessories such as grill adapter means 20, grill means 15, table top means 40, and umbrella means 46.

Accordingly, in one embodiment of the present invention, lateral support assembly 11 includes two lateral support members: first lateral support rod 48 and second lateral support rod 30, as shown in FIG. 1. The lateral support rods may be constructed from any suitable rigid or semi-rigid material, and may be of any desirable length. In a preferred embodiment, first lateral support rod 48 is constructed of 2"×2" square steel tubing having a length of 38 inches. Second lateral support rod is constructed of 2"×2" square steel tubing having a length of 30 inches.

First lateral support rod 48 is connected at end 12 to hitch means 50 of vehicle 55. As best illustrated in FIG. 3B, end 12 of first lateral support rod 48 is provided with opening 49 for receiving a standard locking pin 51 and locking clip 42. In a preferred embodiment, opening 49 has a diameter of ½ inch. However, the size of opening 49 may be varied to accommodate variations in the size of the vehicle hitches to which first lateral support rod 48 is intended to be secured.

Figure 2:
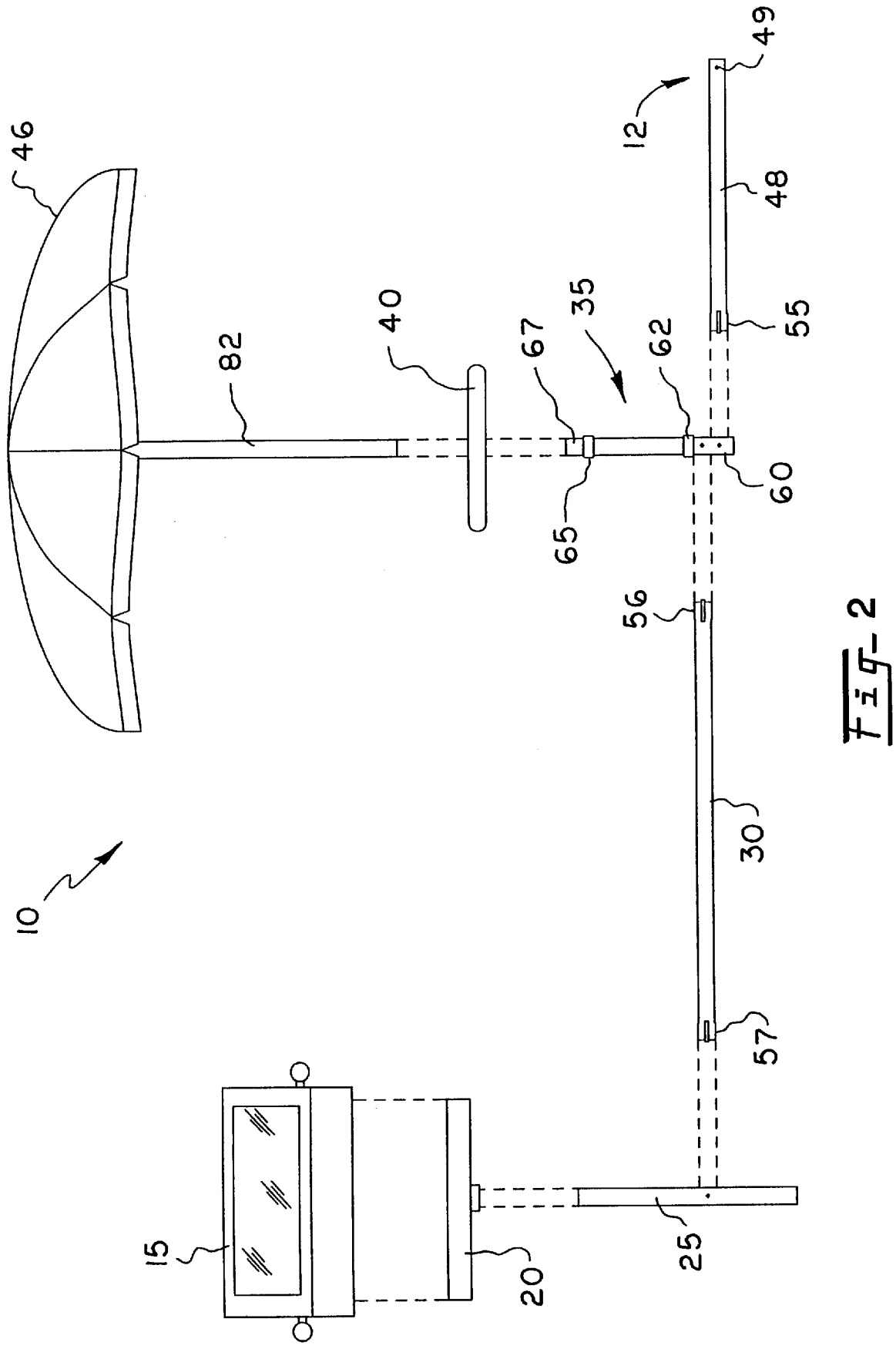
FIG. 2 is an exploded view of the accessory support system of the present invention.

As shown in FIGS. 1, 2 and 3, end 12 of first lateral support rod 48 is inserted into extension 95 of hitch means 50. Opening 49 is aligned with the corresponding openings (not shown) in extension 95. Locking pin 51 is then inserted through the openings (not shown) in extension 95 and opening 49 of first lateral support rod 48 and secured in place by locking clip 42. Other means of securing first lateral support rod 48 to standard vehicle hitches will be apparent to those skilled in the art and these variations remain within the scope of the present invention. Such other securing means include, but are not limited to, clamping means, bolt means and threaded receiving nut means.

At the other end of first lateral support rod 48 is first interconnecting means 55, as shown in FIG. 3. In a preferred embodiment, first interconnecting means 55 comprises a bushing surrounding a first opening 96. The bushing comprising first interconnecting means 55 may be welded onto first lateral support rod 48, or affixed to first lateral support rod 48 by other means such as bolts or pins known to those skilled in the art. Alternatively, the first interconnecting means 55 may be formed as an integral part of first lateral support rod 48.

Continuing with a preferred embodiment, first interconnecting means 55 includes an second opening 33 for receiving fastening means 47. First interconnecting means 55 is drilled and tapped to form second opening 33 such that second opening 33 is suitable for receiving set screw 47. However, any suitable fastening means such as a threaded screw, bolt, pin, etc. may be employed to secure vertical coupling means 35 within interconnecting means 55. All of these variations remain within the scope of the present invention.

As shown in FIGS. 1, 2 and 3, end 60 of vertical coupling means 35 is inserted through opening 96 of first interconnecting means 55 and secured such that first lateral support rod 48 tends to hold vertical coupling means 35 in a steady upright position.

As shown in FIGS. 1, 2 and 4, lateral support assembly 11 further includes second lateral support rod 30 having second and third interconnecting means 56 and 57 at each end. One end of second lateral support rod 30 is coupled to first lateral support rod 48 by inserting end 60 of vertical coupling means 35 through opening 97 of second interconnecting means 56.

The other end of second lateral support rod 30 is connected to vertical support means 25 by inserting one end of vertical support means 25 through opening 98 of third interconnecting means 57 such that second lateral support rod 30 tends to support vertical support means 25 in a steady upright position.

Figure 4A:
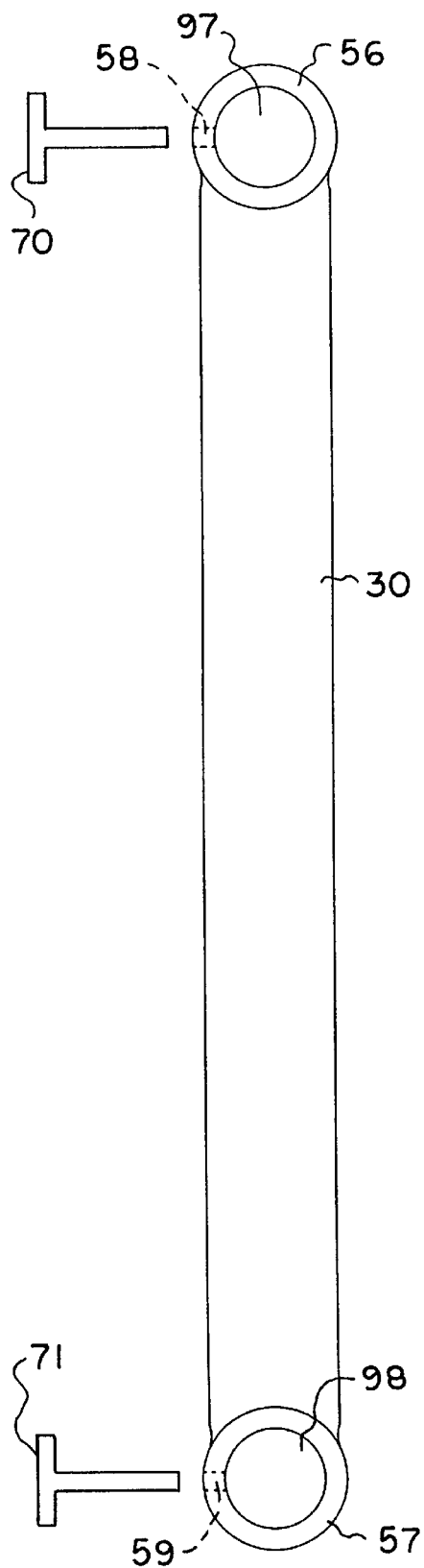
FIG. 4A is a top view of the second lateral support rod.
Figure 4B:
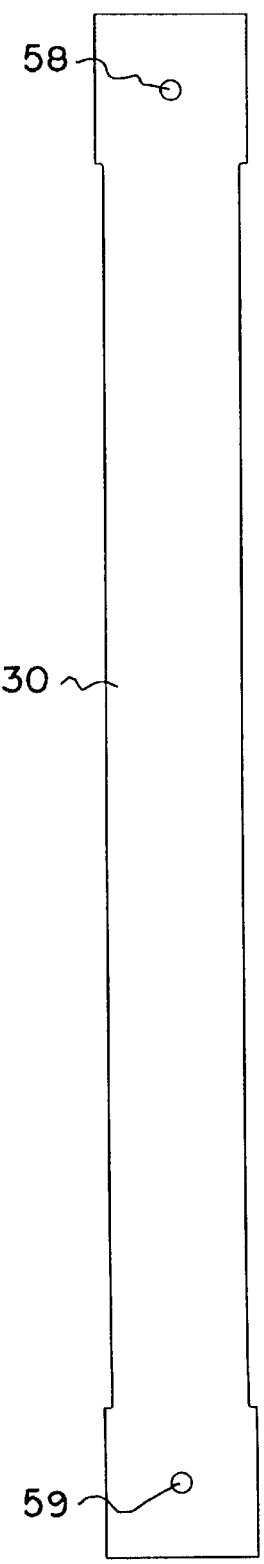
FIG. 4B is a side elevation view of the second lateral support rod.

Second lateral support rod 30 is shown in detail in FIGS. 4A and 4B. As shown in FIG. 4A, second and third interconnecting means 56 and 57 are located at opposite ends of second lateral support rod 30, and comprise bushings affixed at the ends of second lateral support rod 30. Second and third interconnecting means 56 and 57 may be affixed to second lateral support rod 30 by welding or other know means, or may be formed as an integral part of second lateral support rod 30.

Second and third interconnecting means 56 and 57 include openings 58 and 59 for receiving fastening means 70 and 71 respectively. In a preferred embodiment, second and third interconnecting means 56 and 57 are drilled and tapped to form openings 58 and 59 such that openings 58 and 59 are suitable for receiving set screws 70 and 71. However, any suitable fastening means such as threaded screws, bolts, pins, etc. may be employed to secure vertical coupling means 35 within first interconnecting means 56, and vertical support means 25 within second interconnecting means 57. All of these variations remain within the scope of the present invention.

Vertical coupling means 35 couples first support rod 48 with second support rod 30 such that second vertical support rod 30 may be pivoted about vertical coupling means 35 to allow positioning of grill means 15 anywhere along about a 270° arc 2 about its pivot point 3. This permits grill means 15 to be advantageously positioned with respect to prevailing winds or arranged to fit within limited or constrained spaces.

In a preferred embodiment of the present invention, vertical coupling means 35 is formed so as to act as both a coupling means for lateral support rods 30 and 48, and a vertical support means to support recreational accessories such as table top means 40 and umbrella means 46.

Figure 5:
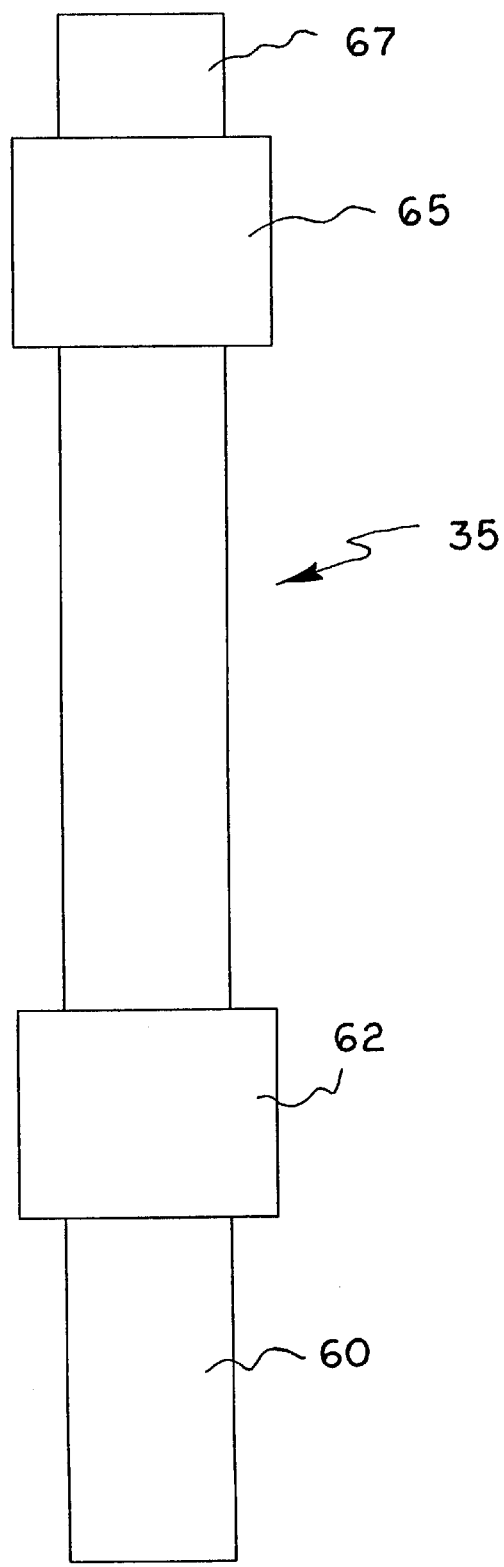
FIG. 5 is a side elevation view of the table top support means.

As best illustrated in FIGS. 2 and 5, vertical coupling means 35 is a length of at least partially hollow, round tubing constructed of suitable rigid or semi rigid material which may be metal. Vertical coupling means 35 includes two collars 62 and 65 affixed thereto. Collars 62 and 65 may be adjustable to accommodate varying widths and support requirements of table top means 40 or other recreational accessories. End 60 of vertical coupling means 35 is inserted through openings 96 and 97 of first and second interconnecting means 55 and 56 respectively. The position of first collar 62 along vertical coupling means 35 defines end 60 such that both first and second interconnecting means 55 and 56 come into secure contact with end 60 and first collar 62. First collar 62 acts as a stop to prevent vertical coupling means 35 from sliding downward once it is secured to first and second interconnecting means 55 and 56, and is subjected to downward pressure.

Figure 6:
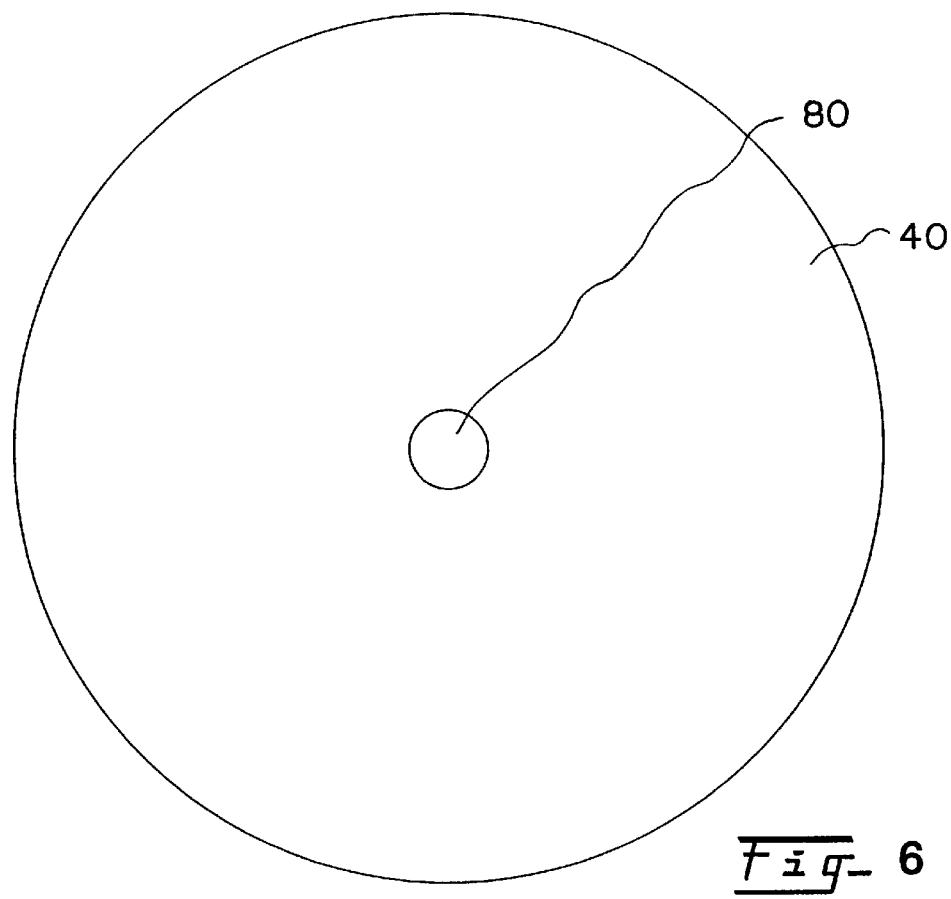
FIG. 6 is a top view of the table top means.
Figure 7:
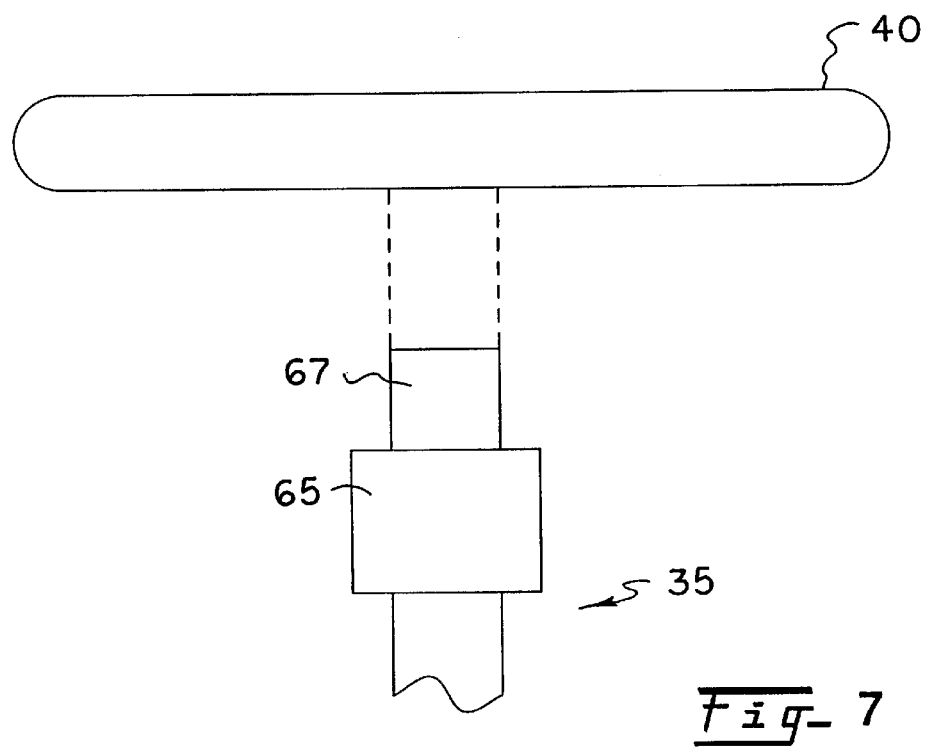
FIG. 7 is an exploded side elevation view of the table top means.

End 67 of vertical coupling means 35 is adapted to pass through opening 80 of table top means 40 (shown in FIG. 6). Second collar 65 acts as a stop to prevent downward motion of table top 40 once table top 40 is positioned above and mechanically engages end 67 of vertical coupling means 35 as best illustrated in FIG. 7.

Vertical coupling means 35 is at least partially hollow and has an inner diameter sufficient to allow the stem 82 of umbrella means 46 (shown in FIG. 1 and 2) to be inserted through opening 80 of table top means 40 and into vertical coupling means 35 to a depth sufficient to hold stem 82 firmly in place when umbrella 46 is in fully unfolded position.

As shown in FIGS. 1, 2 and 4, the distal end of second lateral support rod 30 is connected to vertical support means 25 by inserting the bottom end of vertical support means 25 through opening 98 of third interconnecting means 57 of lateral support rod 30.

As best illustrated in FIG. 8, vertical support means 25 may be constructed of round tubing constructed of a suitable rigid or semi rigid material which may be metal, and may be at least partially hollow or solid. In a preferred embodiment, vertical support means 25 is hollowed and may include bottom cap 87 to prevent dirt and debris from entering a hollow center portion of vertical support means 25.

Vertical support means 25 may further include wheel means 110 (shown in FIG. 10), such as a commercially available wheel and caster assembly, affixed at the lower end of vertical support means 25 such that grill means 15 may be more easily moved into a desirable position.

FIGS. 9A and 9B show one variation of grill adapter means 20 which is constructed to attach to a commercially available grill means such as the Sea B Que grill or other similar grill means readily obtainable from known sources. As shown in FIG. 9B, grill adapter means 20 includes openings 88 and 89. Openings 88 and 89 allow gas conducting means 18 of grill means 15 to be inserted therethrough so that grill means 15 may be operably connected to gas container means 45, as illustrated in FIG. 1.

Other variations of grill adapter means 20 may be constructed to attach any available grill means to vertical support means 25 allowing motor vehicle accessory support system 10 to used with a wide variety of commercially available grills. All of these variations will be readily apparent to those skilled in the art and remain within the scope of the present invention.

Figure 10:
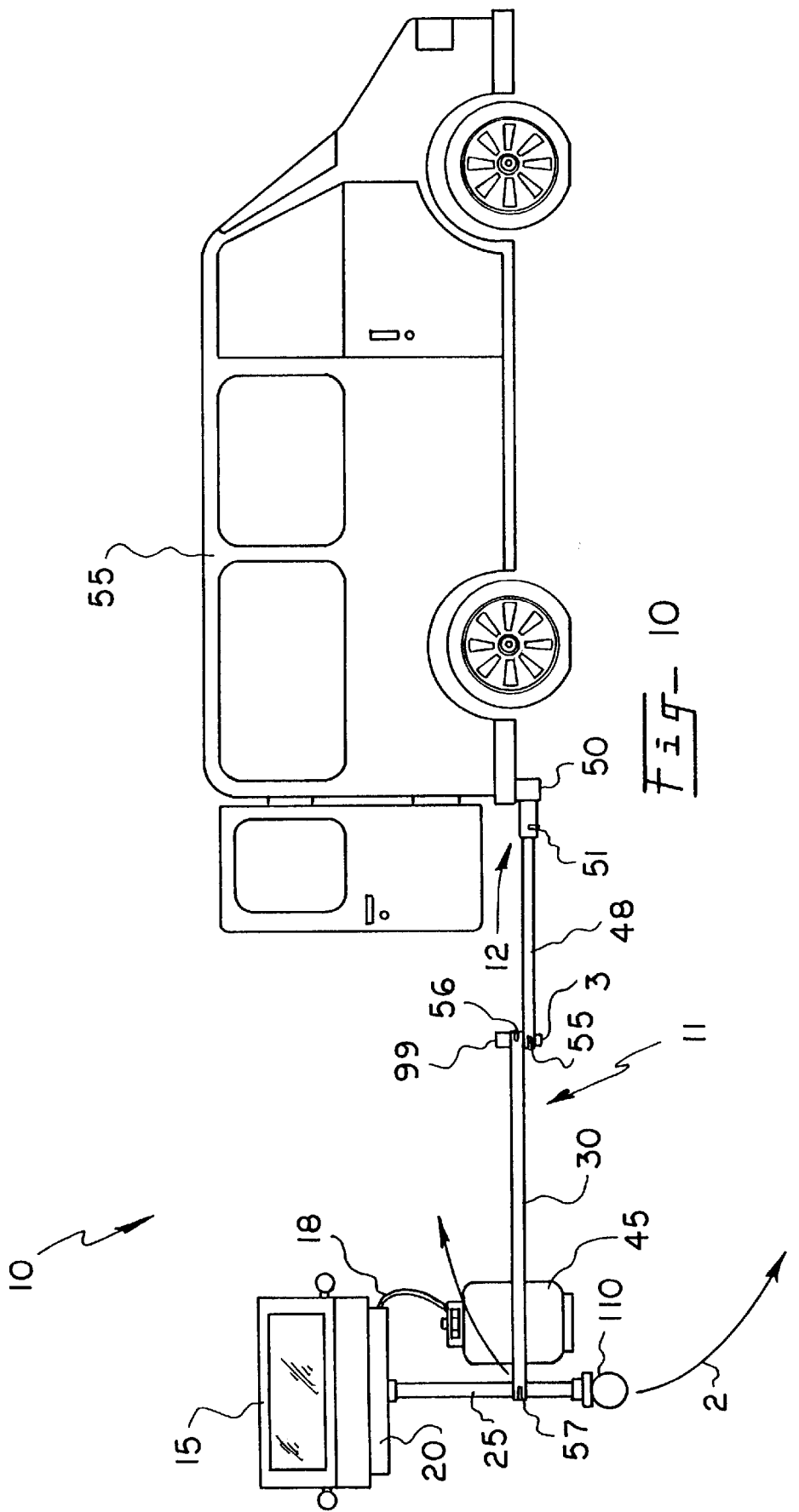
FIG. 10 is a side elevation view of a second embodiment of the present invention including a grill means.

Many modifications of a preferred embodiment of the present invention are apparent, including that shown in FIG. 10 wherein a single recreational accessory, here grill means 15, is supported by lateral support assembly 11.

As with the embodiment shown in FIG. 1, lateral support assembly 11 includes first lateral support rod 48 and second lateral support rod 30. First lateral support rod 48 is connected at end 12 with hitch means 50 of vehicle 55. The other end of first lateral support rod 48 is attached to vertical coupling means 99, which in this embodiment comprises only end 60 and collar 62 of the embodiment shown in FIG. 5.

As shown in FIGS. 1 and 3, end 60 of vertical coupling means 35 is inserted through opening 96 of first interconnecting means 55 and secured. Vertical coupling means 35 is further inserted through opening 97 of second interconnecting means 56 as shown in FIGS. 1 and 4. Lateral support rod 48 or lateral support rod 30 may be connected in any order to vertical coupling means 99.

Vertical coupling means 99 thereby couples first support rod 48 with second support rod 30 such that second vertical support rod 30 may be pivoted about vertical coupling means 99 to allow positioning of grill means 15 anywhere along about a 270° arc 2 about pivot point 3. This permits grill means 15 to be advantageously positioned with respect to prevailing winds or other preferences of the user of accessory support system 10.

FIG. 11 illustrates yet another modification of the invention wherein accessory support system 10 supports table top means 40 and umbrella means 46. As with the embodiment shown in FIG. 1, lateral support assembly 11 includes first lateral support rod 48 and second lateral support rod 30. First lateral support rod 48 is connected at end 12 with hitch means 50 of vehicle 55.

The other end of first lateral support rod 48 is attached to vertical coupling means 99. Vertical coupling means 99 is similar to vertical coupling means 35 (shown in FIG. 5) except vertical coupling means 99 comprises only end 60 and collar 62.

Vertical coupling means 99 is inserted through opening 96 of first interconnecting means 55 (shown in FIG. 3B) and secured. Vertical coupling means 99 is further inserted through opening 97 of second interconnecting means 56 (shown in FIG. 4A).

Vertical coupling means 99 thereby couples first support rod 48 with second lateral support rod 30 such that second vertical support rod 30 may be pivoted about vertical coupling means 99, and pivot point 3, to allow positioning of table top means 40 and umbrella means 46 anywhere along about a 270° arc 2. This permits table top means 40 and umbrella means 46 to be advantageously positioned with respect to prevailing winds or limitations in the space surrounding vehicle 55.

The other end of second lateral support rod 30 is connected to a second vertical coupling means 135. Second vertical coupling means 135 is identical to vertical coupling means 35 (shown in FIG. 5). End 60 of second vertical coupling means 135 is inserted through opening 98 of second lateral support rod 30 (shown in FIG. 4A) and secured by inserting set screw means 71 through opening 59.

Stem 82 of umbrella means 46 is then inserted through opening 80 of table top means 40 (shown in FIG. 6) and removably disposed within second vertical coupling means 135.

A method for supporting recreational accessories for dining out of doors is also provided by the present invention. The method includes the steps of: a) providing a lateral support assembly, b) affixing the lateral support assembly to a vehicle, c) providing one or more vertical support means, d) removably engaging the one or more vertical support means to the lateral support assembly, and e) affixing one or more recreational accessories to said one or more vertical support means such that said recreational accessories are securely supported in position for use.

It is to be understood that the above described embodiments are simply illustrative of the application of the principles in accordance with the present invention. Other embodiments may be readily devised by those skilled in the art which may embody the principles in spirit and scope of the appended claims.

I claim:

1. An accessory support system for mounting a grill to a motor vehicle comprising:

a lateral support assembly having a first lateral support member and a second lateral support member, the first lateral support member adapted at one end to detachably mount to the exterior of a vehicle, the lateral support assembly extending outwardly from the vehicle;

a vertical coupling member capable of detachably connecting the first lateral support member to the second lateral support member; and, a vertical support rod capable of removably engaging the lateral support assembly, the vertical support rod adapted to support a recreational accessory in a position such that the recreational accessory is useable while being supported by the vertical support member, the vertical support rod being adapted at one end to mechanically engage a grill adapter, the grill adapter capable of receiving and securely supporting the grill in a position suitable for cooking, the grill adapter having an opening capable of passing a gas tube from the grill to a gas supply.

2. An accessory support system comprising:

at least one vertical support rod adapted to removably engage a grill, the vertical support rod having a wheel affixed at one end of the vertical support rod such that the grill may be wheeled into a desired position;

at least one vertical coupling rod;

a first lateral support rod having a first end portion adapted to connect to the exterior of a vehicle and a second end portion adapted to removably engage said vertical coupling rod; and, a second lateral support rod having a first end portion adapted to rotatably engage said vertical coupling rod, and a second end portion adapted to removably engage said vertical support rod, such that said vertical support rod is capable of being positioned along about a 270° arc about the pivot point of said vertical coupling rod.

* * * * *